(12) United States Patent
Braundmeier et al.

(10) Patent No.: US 10,659,605 B1
(45) Date of Patent: May 19, 2020

(54) AUTOMATICALLY UNSUBSCRIBING FROM AUTOMATED CALLS BASED ON CALL AUDIO PATTERNS

(71) Applicant: MASTERCARD INTERNATIONAL INCORPORATED, Purchase, NY (US)

(72) Inventors: Aaron Braundmeier, O'Fallon, MO (US); Anthony Hake, Lake St. Louis, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 16/395,994

(22) Filed: Apr. 26, 2019

(51) Int. Cl.
| | |
|---|---|
| *H04M 3/42* | (2006.01) |
| *H04M 1/56* | (2006.01) |
| *H04M 15/06* | (2006.01) |
| *H04M 3/436* | (2006.01) |
| *G06F 9/54* | (2006.01) |
| *G10L 25/51* | (2013.01) |
| *H04M 3/22* | (2006.01) |

(52) U.S. Cl.
CPC ............ *H04M 3/436* (2013.01); *G06F 9/542* (2013.01); *G10L 25/51* (2013.01); *H04M 3/2281* (2013.01); *H04M 3/42229* (2013.01)

(58) Field of Classification Search
CPC ...... G06F 9/542; G10L 25/51; H04M 3/2281; H04M 3/42229; H04M 3/436
USPC ............... 379/114.3, 142.02, 210.02, 210.03
See application file for complete search history.

(56) References Cited

U.S. PATENT DOCUMENTS

| | | | | |
|---|---|---|---|---|
| 5,930,700 A | * | 7/1999 | Pepper ................. | H04M 1/663 379/211.02 |
| 6,185,283 B1 | * | 2/2001 | Fuller .................. | H04M 1/006 379/88.21 |
| 6,621,896 B1 | * | 9/2003 | Rinn ..................... | H04M 1/663 379/209.01 |
| 6,639,972 B1 | | 10/2003 | Cannon et al. | |
| 6,687,339 B2 | | 2/2004 | Martin | |

(Continued)

OTHER PUBLICATIONS

Unknown, "RoboKiller: The App That Stops Spam Calls Forever," TelTech Co., accessed on Jan. 19, 2019, https://www.robokiller.com, 9 pages.

(Continued)

*Primary Examiner* — Khai N. Nguyen

(57) ABSTRACT

The disclosure herein describes automatically unsubscribing from automated calls based on automated call audio patterns. Audio data of an incoming call is accessed and an incoming call audio pattern is generated based on the audio data of the incoming call. The incoming call audio pattern is compared to an automated call audio pattern set by a call screening engine. Based on the comparison, the user is prompted for a call response instruction. Based on the call response instruction from the user, the call screening engine identifies an unsubscribe operation indication in the incoming call audio pattern, performs an unsubscribe operation associated with the identified unsubscribe operation indication, and updates the automated call audio pattern set based on the incoming call audio pattern. The disclosure enables efficient handling of automated calls and reduces user interaction necessary to unsubscribe from associated call lists.

20 Claims, 6 Drawing Sheets

(56) References Cited

U.S. PATENT DOCUMENTS

| | | | | |
|---|---|---|---|---|
| 6,711,401 | B1* | 3/2004 | Chow | H04M 3/42314 455/414.1 |
| 7,236,577 | B2 | 6/2007 | Lection et al. | |
| 7,248,680 | B1* | 7/2007 | Gainsboro | H04M 3/20 379/189 |
| 7,839,987 | B1* | 11/2010 | Kirchhoff | H04M 3/42195 379/142.01 |
| 8,135,790 | B1* | 3/2012 | Castelli | G06Q 10/107 709/206 |
| 8,503,637 | B1* | 8/2013 | Kirchhoff | H04M 3/42195 379/142.01 |
| 8,666,034 | B2 | 3/2014 | Christie, IV | |
| 8,861,694 | B1* | 10/2014 | Kirchhoff | H04M 3/42195 379/142.01 |
| 8,913,994 | B2 | 12/2014 | Edwards et al. | |
| 9,113,336 | B2 | 8/2015 | Nieves | |
| 9,544,431 | B2 | 1/2017 | Zhang et al. | |
| 9,615,229 | B2* | 4/2017 | Joo | H04W 4/16 |
| 10,051,121 | B2 | 8/2018 | Quilici et al. | |
| 10,057,419 | B2 | 8/2018 | Chan et al. | |
| 10,194,022 | B2* | 1/2019 | Cooper | H04M 3/2281 |
| 2004/0131164 | A1 | 7/2004 | Gould | |
| 2004/0165706 | A1* | 8/2004 | Sarakas | H04M 1/723 379/88.22 |
| 2006/0264205 | A1 | 11/2006 | Gibbs | |
| 2007/0041524 | A1* | 2/2007 | Webster | H04M 3/42042 379/88.17 |
| 2013/0322431 | A1* | 12/2013 | Wood | H04M 3/42153 370/352 |
| 2014/0112459 | A1* | 4/2014 | Goulet | H04M 3/436 379/88.01 |
| 2016/0345171 | A1* | 11/2016 | Kulkarni | H04M 3/42042 |
| 2017/0019534 | A1 | 1/2017 | Qin et al. | |
| 2017/0310822 | A1 | 10/2017 | Korn | |
| 2018/0013881 | A1* | 1/2018 | Cooper | H04M 3/2281 |
| 2018/0018969 | A1 | 1/2018 | Bentitou et al. | |
| 2018/0295236 | A1 | 10/2018 | Ansari | |

OTHER PUBLICATIONS

Chokkattu, "Here's how Google's Call Screening A.I. Works, and How to Use It," Digital Trends, Updated on Dec. 4, 2018, https://www.digitaltrends.com/mobile/google-call-screening-how-to-use/, 14 pages.

Unknown, "Call Screening & Call Blocking," RingCentral, accessed on Jan. 19, 2019, https://www.ringcentral.com/office/features/call-screening/overview.html, 4 pages.

Price, "How to Make Spam Calls Automatically Go to Voicemail on Android," Lifehacker, Jul. 14, 2018, https://lifehacker.com/how-to-make-spam-calls-automatically-go-to-voicemail-on-1827600914, 3 pages.

Unknown, "Detect and Block Spam Phone Calls with Third-Party Apps," Apple Inc., accessed Jan. 19, 2019, https://support.apple.com/en-us/HT207099, 4 pages.

* cited by examiner

AUTOMATICALLY UNSUBSCRIBING FROM AUTOMATED CALLS BASED ON CALL AUDIO PATTERNS

BACKGROUND

Automated sales calls, robo-calls, or "spam" calls have become a frequent and persistent nuisance for many people. With the ubiquity of personal cellular phones, many users are subjected to automated calls at nearly any time of day and in nearly any place or situation. While blocking a number prevents receiving more calls from the blocked number, entities that make large quantities of sales calls use a multitude of source numbers for their automated call efforts. Further strategies used by automated calling entities include "spoofing" numbers to avoid blocked call lists.

While some entities that make automated calls provide ways to unsubscribe from associated call lists, in many cases the process requires that the recipient of the call answer the call, listen to an automated message for a potentially significant amount of time, and then perform an action, such as saying the word "unsubscribe" when the automated call prompts the recipient to do so. Additionally, automated call recipients may be required to navigate audio-based menus of options by pressing or saying numbers or keywords or they may be placed on hold or otherwise caused to wait to be able to unsubscribe from the call list, thereby further wasting the recipient's time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for automatically unsubscribing from automated calls based on automated call audio patterns is described. A call screening engine on a computing device of a user accesses audio data of an incoming call. An incoming call audio pattern is generated based on the audio data of the incoming call. The incoming call audio pattern is compared to an automated call audio pattern set that includes at least one of audio patterns associated with calls identified as automated calls or audio patterns associated with calls from which users have previously unsubscribed. Based on comparing the incoming call audio pattern to the automated call audio pattern set, the user is prompted for a call response instruction. Based on the call response instruction from the user, the call screening engine identifies an unsubscribe operation indication in the incoming call audio pattern, performs an unsubscribe operation associated with the identified unsubscribe operation indication, and updates the automated call audio pattern set based on the incoming call audio pattern.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for automatically unsubscribing from automated calls based on automated call audio patterns. Upon a call being received on a computing device of a user, a call screening engine on the device accesses audio data of an incoming call. An incoming call audio pattern is generated based on the audio data of the incoming call and the incoming call audio pattern is compared to an automated call audio pattern set. The automated call pattern set includes audio patterns associated with calls identified as automated calls, audio patterns associated with calls from which users have previously unsubscribed, or the like. Based on the comparison, the user is prompted for a call response instruction. Based on the user responding to the prompt with an instruction to unsubscribe from the call, the call screening engine identifies an unsubscribe operation indication in the incoming call audio pattern, performs the unsubscribe operation associated with the identified unsubscribe operation indication, and updates the automated call audio pattern set based on the incoming call audio pattern, such that the call that was just completed can be used to inform decisions made about future incoming calls.

The disclosure handles automated calls in such a way that the required user interactions to unsubscribe from call lists are reduced or eliminated without inaccurately screening calls that the users want to receive. For example, the disclosure automatically decides how to handle incoming calls by comparing patterns of the incoming calls to a set of call patterns for which correctly made decisions are known. By applying deep learning classification algorithms and techniques, call handling actions are made based on the incoming call audio pattern. In many cases, the decisions made and actions taken automatically by the disclosure enable users to choose to unsubscribe from call lists while reducing user interactions required for the users to actually perform the unsubscribe operations.

The disclosure operates in an unconventional way at least by automatically storing call audio patterns and the associated results of the call for use by the disclosed system to make call handling decisions about future incoming calls. By consistently updating the call audio pattern data used by the system to make decisions, the ability of the disclosure to identify calls that are automated and undesirable to users (e.g., spam calls), calls that are automated and desirable to users, and calls that are not automated becomes increasingly accurate. Further, the disclosure is able to efficiently achieve an accurate call classifying model based on large quantities of call audio pattern data from many different users as well as specifically train and tune the model based on call audio pattern data of a user to handle calls in accordance with that user's preferences.

Figure 1:
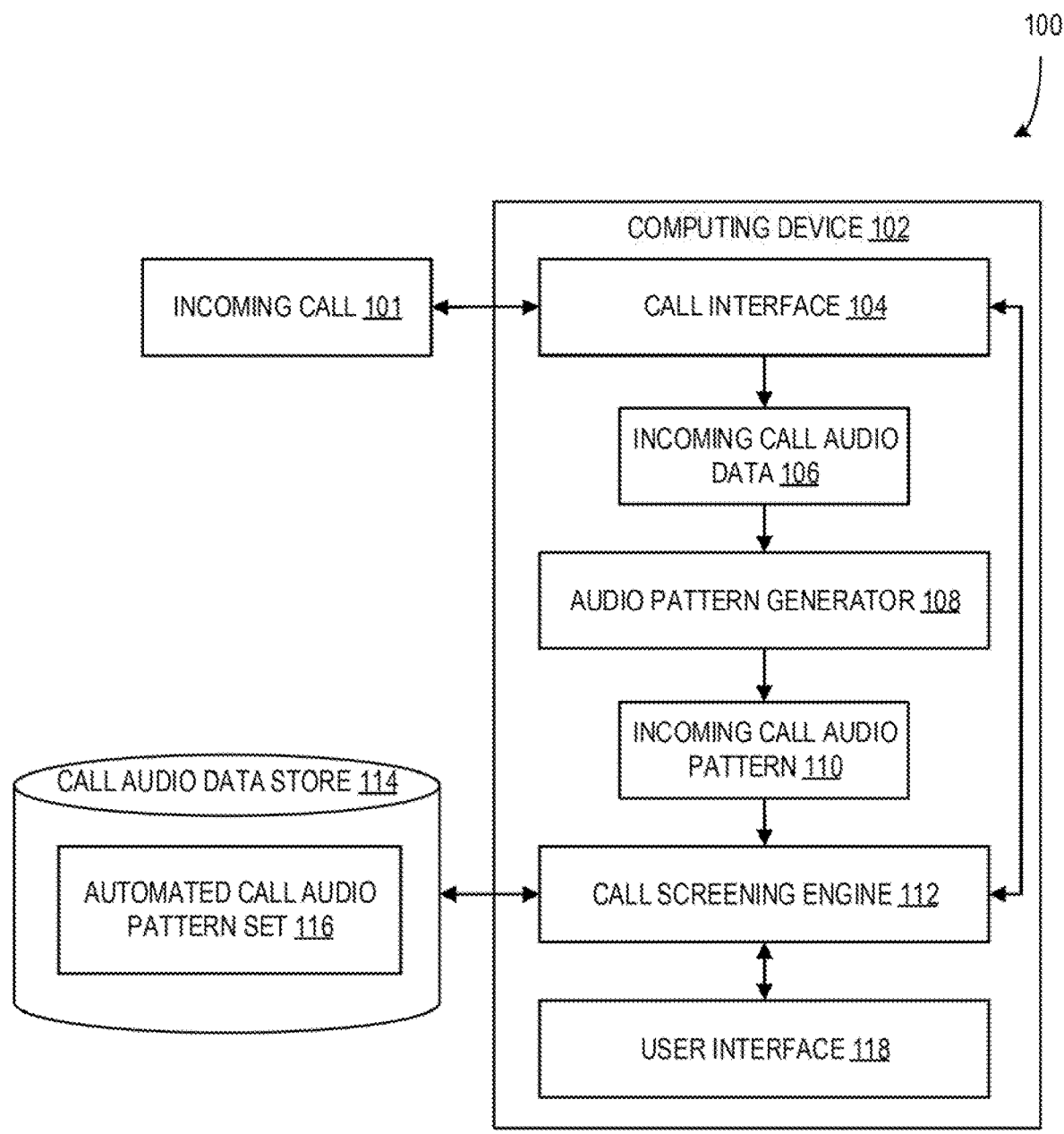
FIG. 1 is a block diagram illustrating a system configured for automatically unsubscribing from automated calls based on automated call audio patterns according to an embodiment.

FIG. 1 is a block diagram illustrating a system 100 configured for automatically unsubscribing from automated phone calls (e.g., incoming call 101) based on automated call audio patterns (e.g., automated call audio pattern set 116) according to an embodiment. The system 100 includes a computing device 102 that is configured to receive an incoming call 101 via a call interface 104 and/or receive or otherwise access incoming call audio data 106 of the incoming call 101. The computing device 102 further includes an audio pattern generator 108 configured to generate an incoming call audio pattern 110 and a call screening engine 112 configured to interact with the incoming call 101 via the call interface 104 based on a comparison of the incoming call audio pattern 110 to an automated call audio pattern set 116 in a call audio data store 114. The computing device 102 also includes a user interface 118 that is configured to provide information to a user about the incoming call 101 and/or the interaction of the call screening engine 112 with the incoming call 101 as well as enabling the user to provide feedback to prompts from the call screening engine 112 as described herein.

The computing device 102 may be a mobile phone, a tablet, a laptop, a personal computer, or another type of computing device. Further, while the components of the computing device 102 are illustrated as part of the computing device, in alternative examples, some or all of the components of the computing device 102 (e.g., call interface 104, audio pattern generator 108, and/or call screening engine 112) are located and/or executed on one or more servers or other computing devices separate from the computing device 102, such that the operations described herein include communication with the computing device 102 over a network connection, without departing from the description herein.

The call interface 104 of the computing device 102 includes hardware, firmware, and/or software configured to receive calls (e.g., incoming call 101) and/or access audio data (e.g. incoming call audio data 106) of incoming calls for use by other components of the system 100 as described herein. In some examples, the call interface 104 is configured to interact with a communication network, such as a cellular communication network, a voice over Internet protocol (VOIP) communication network, or the like, to receive calls directed to the computing device 102 based on a phone number or other identifier associated with the computing device 102.

In alternative examples, the computing device 102 includes a separate interface for receiving calls and the call interface 104 is configured to specifically access the incoming call audio data 106 of incoming calls for use by the other components of the system 100 as described herein. For instance, the computing device 102 includes a default phone call application that is configured to directly interface with calls and the call interface 104 is a part of an automated call screening and unsubscribing application that is configured to interact with calls via the default phone call application. It should be understood that the call interface 104 may be configured to interact with the incoming call 101 in other ways that would be understood by a person of ordinary skill in the art without departing from the description herein.

The incoming call audio data 106 received or otherwise accessed by the call interface 104 includes data in a format that is playable as audio to a user of the computing device 102. In some examples, the incoming call audio data 106 is in the form of a real-time or near real-time audio data stream from the incoming call 101 and accessed by the call interface 104, enabling components of the system 100 to interact with the incoming call 101 as it occurs. Alternatively, or additionally, the incoming call audio data 106 may be in the form of stored audio data, such as a file or files of the audio of the incoming call 101, enabling components of the system 100 to interact with the audio data of the incoming call 101 during the call or after the call is completed. Further, in some examples, the incoming call audio data 106 is stored and used after the incoming call 101 is completed to train or otherwise improve the call screening engine 112 as described herein.

The audio pattern generator 108 receives or otherwise accesses the incoming call audio data 106, whether in a real-time data stream format, file format, or other format. The audio pattern generator 108 includes hardware, firmware, and/or software configured to generate an incoming call audio pattern 110 from the incoming call audio data 106. In some examples, the generation of the incoming call audio pattern 110 includes converting or otherwise transforming the incoming call audio data 106 into a text format using speech-to-text conversion techniques as would be understood by a person of ordinary skill in the art. Further, the generation of the incoming call audio pattern 110 includes combining the resulting text from the speech-to-text conversion with metadata associated with the incoming call audio data 106 (e.g., the phone number or identifier of the caller of the incoming call 101, a date and/or time of the incoming call 101, or the like). After generation, the incoming call audio pattern 110 is in a format that enables the call screening engine 112 to perform data analysis operations upon the pattern 110, including comparing the pattern 110 to the automated call audio pattern set 116, as described herein.

In some examples, the audio pattern generator 108 performs the generation of the incoming call audio pattern 110 in real-time or near real-time during the incoming call 101. For instance, text data of the incoming call audio pattern 110 is generated by the audio pattern generator 108 as the audio data 106 is received in a real-time data stream. It should be understood that, because many of the operations of the system 100 described herein occur during an active call, the components of the system 100, including the call interface 104, the audio pattern generator 108, the call screening engine 112, and the user interface 118, are configured to operate in parallel or otherwise to operate asynchronously from each other (e.g., as the audio pattern generator 108 provides portions of the incoming call audio pattern 110 in real-time to the call screening engine 112, the call screening engine 112 is configured to perform analysis operations on the portions of the incoming call audio pattern 110 as they are received).

The call screening engine 112 includes hardware, firmware, and/or software configured for comparing the incoming call audio pattern 110 to the automated call audio pattern set 116 of the call audio data store 114. Based on that comparison, the call screening engine 112 is further configured to automatically interact with and handle the incoming call 101 via the call interface 104, as well as communicate with a user about the incoming call 101 via the user interface 118. The configuration of the call screening engine 112 is also described in greater detail below with respect to FIGS. 2, 3, and 4. In some examples, the incoming call audio pattern 110 and the patterns of the automated call audio pattern set 116 include text data of the words being spoken in the call 101. In that case, the call screening engine 112 is configured to compare words and/or phrases in the text data of the incoming call audio pattern 110 to the words and/or phrases in the patterns of the automated call audio pattern set 116. The call screening engine 112 is configured to identify similarities in the words and/or phrases of the compared patterns and make automatic decisions regarding the incoming call based on those identified similarities. For instance, a portion of the patterns in the automated call audio pattern set 116 are associated with calls that are known to be automated calls, or robo-calls, from merchants, businesses, or other entities that the receiving users were not interested in receiving. If the pattern 110 of the incoming call 101 closely matches the words and/or phrases of one or more of the known automated calls, the call screening engine 112 may be configured to handle the incoming call 101 as an automated call. In some examples, handling an automated call includes prompting the user of the computing device 102, via the user interface 118, for instructions as to how to handle the call, identifying an unsubscribe operation from the incoming call audio pattern 110 and performing the unsubscribe operation based on instructions provided from the user in response to the prompt (e.g., the incoming call 101 includes an instruction stating to press the nine key to unsubscribe from the call list and the call screening engine 112 is configured to simulate or otherwise provide a response to the incoming call 101 that includes data associated with pressing the nine key). Alternatively, or additionally, the call screening engine 112 is configured to identify the unsubscribe operation from the incoming call audio pattern 110 and perform the unsubscribe operation automatically without prompting the user or otherwise receiving specific instructions from the user.

The call screening engine 112 may be configured to handle the incoming call 101 in other ways without departing from the description. In some examples, the call screening engine 112 is configured to engage in a synthetic "conversation" with the calling party of the incoming call 101 via the call interface 104 to determine the calling party's identity and/or the purpose of the call. Further call handling operations of the call screening engine 112 and/or associated components are described in greater detail below with respect to FIGS. 2-5.

In some examples, upon completion of the incoming call 101, the call screening engine 112 is configured to update the automated call audio pattern set 116 with the incoming call audio pattern 110, including information indicating how the incoming call 101 was handled by the call screening engine 112, any instructions or feedback received from the user during the call, and/or any interaction between the call screening engine 112 and the calling party of the incoming call 101. Further, updating the automated call audio pattern set 116 with the incoming call audio pattern 110 may include using the incoming call audio pattern 110 to improve the efficiency and/or functionality of the call screening engine 112 or the overall system 100 through machine learning or the like. These features are described in greater detail below with respect to at least FIG. 2.

The call audio data store 114 is a data store configured to store the automated call audio pattern set 116 and to interact with the call screening engine 112 to enable the call screening engine 112 to access the automated call audio pattern set 116. The call audio data store 114 may be configured as a database or other type of data store as would be understood by person of ordinary skill in the art. In some examples, the call audio data store 114 is configured as a cloud data store on one or more servers accessible to the computing device 102 via a network connection. Alternatively, or additionally, the computing device 102 is configured to store some or all of the automated call audio pattern set 116 locally, such that the call audio data store 114 is effectively located within the computing device 102. Other arrangements are also possible without departing from the description herein. For instance, the call audio data store 114 is primarily located in the cloud, but the computing device 102 is also configured to download and cache some or all of the automated call audio pattern set 116 for use by the call screening engine 112 during the call handling operations described herein.

The automated call audio pattern set 116 includes call audio patterns from previous calls, as mentioned above. In some examples, the automated call audio pattern set 116 includes call audio patterns associated with calls from a plurality of different computing devices and associated with a plurality of different calling parties and/or receiving parties. Each call audio pattern of the pattern set 116 includes data of the associated call in the same format as the incoming call audio pattern 110 to enable the comparison and/or other analysis operations performed by the call screening engine 112. Further, each call audio pattern includes metadata associated with the call, such as caller number or other identifier, a call timestamp, or the like. Each call audio pattern of the pattern set 116 is also associated with information indicating how the call was handled. For instance, a call audio pattern may be associated with user feedback indicating that the call was an automated call the user would have preferred to screen, a system indicator indicating that the call was from a number associated with a known or common automated calling party, or the like. Additionally, if the call screening engine 112 of the computing device 102 or another call screening engine of another computing device made a decision about the associated call, the call audio pattern includes that information as well (e.g., information indicating that the call screening engine 112 prompted the user of the computing device 102 and the user instructed the call screening engine 112 to unsubscribe from the call list associated with the call).

The user interface 118 of the computing device 102 includes hardware, firmware, and/or software configured to enable a user to interact with and/or receive information from the computing device 102. In some examples, the user interface 118 includes at least one of a display screen, touchscreen, audio speaker, indicator light, or the like to output information to the user of the computing device 102 and/or at least one of a touchscreen, button, switch, mouse, keyboard, microphone, or the like to receive input information from the user. For instance, the computing device 102 may be a mobile phone device that includes user interfaces 118 of a touchscreen, buttons, lights, speakers, a microphone, and a fingerprint scanning interface. It should be understood that the user interface 118 of the computing device 102 may include more, fewer, or different user interface components without departing from the description herein.

Figure 2:
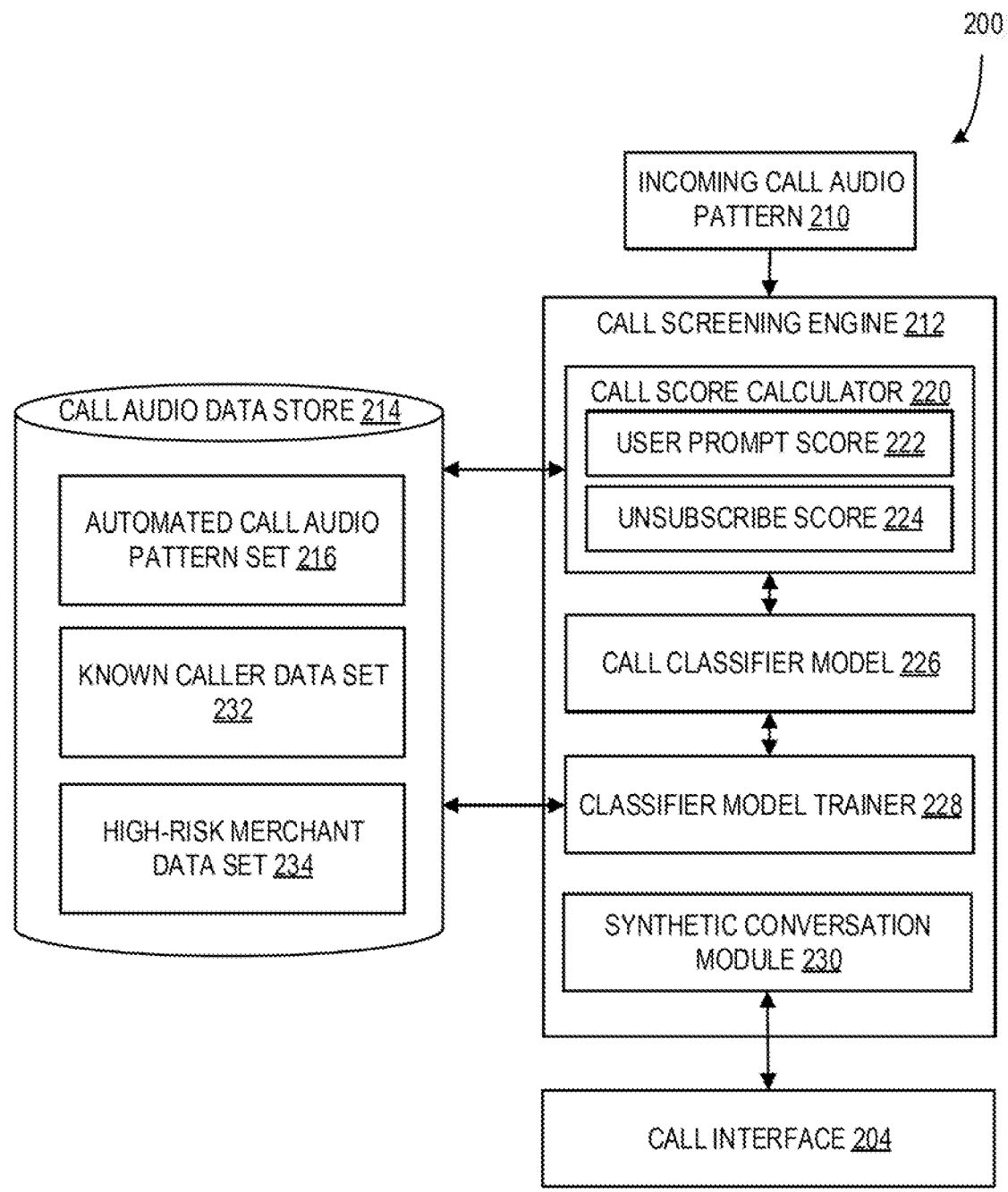
FIG. 2 is a block diagram illustrating a system configured for automatically unsubscribing from automated calls based on a call classifier model that is trained using machine learning according to an embodiment.

FIG. 2 is a block diagram illustrating a system 200 configured for automatically unsubscribing from automated calls based on a call classifier model 226 that is trained using machine learning according to an embodiment. The system 200 includes a call screening engine 212 that is configured to receive an incoming call audio pattern 210 and to make decisions about handling the incoming call associated with the audio pattern 210 as described above. It should be understood that, in some examples, the call screening engine

212 some or all of the features of call screening engine 112 described above and/or system 200 further includes components such as those described with respect to system 100 of FIG. 1 (e.g., the audio pattern generator 108 or the user interface 118).

The call screening engine 212 includes a call score calculator 220, a call classifier model 226, a classifier model trainer 228, and a synthetic conversation module 230. The call score calculator 220 includes hardware, firmware, and/or software configured to calculate a user prompt score 222 and/or an unsubscribe score 224 based on the incoming call audio pattern 210 and the call classifier model 226. The user prompt score 222 is compared to a define user prompt threshold to determine whether the call screening engine 212 prompts the user of the associated computing device for instructions regarding the incoming call associated with the incoming call audio pattern 210. The unsubscribe score 224 is compared to a defined unsubscribe threshold to determine whether the call screening engine 212 attempts to unsubscribe from the call list associated with the incoming call audio pattern 210 automatically without prompting the user. Each threshold may be defined at different levels and/or the calculation done by the call score calculator 220 may be different for each score calculation. In some examples, the unsubscribe score 224 has a higher priority than the user prompt score 222, such that when the unsubscribe score 224 exceeds the unsubscribe threshold, the call screening engine 212 proceeds directly to automatically unsubscribing from the call list without prompting the user.

The call classifier model 226 is a trained model that represents patterns in past calls based on the data stored in the call audio data store 214. The call classifier model 226 is trained by the classifier model trainer 228, which accesses the call audio data store 214 to use the data stored there for training. In some examples, the call classifier model 226 is configured to receive the data of the incoming call audio pattern 210 as input, identify portions of the audio pattern 210 that match or correspond with call pattern rules of the model 226, and adjust the user prompt score 222 and/or the unsubscribe score 224 based on adjustment factors or weights associated with the model call pattern rules (e.g., the incoming call audio pattern 210 includes a phrase that matches a pattern rule of the model 226 that is associated with a call source from which the user previously attempted to unsubscribe and, as a result, the unsubscribe score 224 is increased by a relatively large adjustment factor). The classification result of applying the call classifier model 226 to the incoming call audio pattern 210 is the resulting scores 222 and/or 224 after the call pattern rules of the model 226 have been evaluated.

In further examples, the call classifier model 226 includes call pattern rules that are evaluated based on keywords, phrases, or other word patterns, or based on other metadata in the incoming call audio pattern 210, such as the number or identifier of the calling party. The call pattern rules may be structured as "if-then" conditional statements that are evaluated based on the call audio pattern 210 (e.g., if the incoming call audio pattern 210 includes the phrase "exciting offer", then the unsubscribe score 224 being calculated for the incoming call is increased by an adjustment factor of ten). Such call pattern rules may be configured to evaluate single data points or data values of the call audio pattern 210 (e.g., if a single word or phrase is present in the audio pattern) and/or to evaluate multiple data points or values that are combined with logical operators (e.g., if a phrase is present in the audio pattern and the incoming call is from a known calling party) as would be understood by a person of ordinary skill in the art.

In other examples, the call classifier model 226 is configured to map the incoming call audio pattern 210 to a closest fitting classification based on evaluation of a series of call pattern rules that are arranged in a tree structure, such that each call pattern rule represents a separate branch node of the tree structure and evaluation of each call pattern rule determines which branch node of the tree to evaluate next. Each leaf node of the tree structure (e.g., a node without subsequent branches) represents a classification of the incoming call audio pattern 210 and is associated with particular call handling operations to be performed by the call screening engine. For instance, one classification indicates that the user should be prompted to make a decision about call handling, another classification indicates that the call screening engine 212 should automatically unsubscribe from the call without prompting the user, and yet another classification indicates that the call screening engine 212 should send the call to voicemail. It should further be understood that, in alternative examples, the call classifier model 226 may be configured according to a classification model structure as would be understood by a person of ordinary skill in the art without departing from the description herein.

The classifier model trainer 228 includes hardware, firmware and/or software configured for training the call classifier model 226 based on some or all of the data stored in the call audio data store 214, including the automated call audio pattern set 216, a known caller data set 232, and/or a high-risk merchant data set 234. During the training process, the classifier model trainer 228 performs one or more training operations, such as applying machine learning algorithms, to adjust, alter, or otherwise change the behavior of the call classifier model 226 (e.g., adjusting call pattern rules of the call classifier model 226, including changing how the call pattern rules are triggered and/or the results that occur when the call pattern rules are triggered). The data of the call audio data store 214 are used as training data by the classifier model trainer 228. For instance, each data item or value of the call audio data store 214 is associated with a resulting action taken by the call screening engine 212 and/or an action taken by or otherwise defined by a user or users of the system 200. During the training process, the pairs of data items and resulting actions are used to inform changes made to the call classifier model 226. The changes made to the model 226 are directed to the goal of training the call classifier model 226 to enable the behavior of the system 200 and/or the call screening engine 212 specifically to substantially match the training data in response to incoming calls. In some examples, the training of the call classifier model 226 by the classifier model trainer 228 is performed using deep learning classification algorithms and/or other machine learning techniques.

In some examples, the classifier model trainer 228 includes a machine learning module that comprises a trained regressor such as a random decision forest, a directed acyclic graph, a support vector machine, a convolutional neural network or other neural network, or another trained regressor. Such a trained regressor may be trained using the data in the call audio data store 214 as training data and/or feedback data. It should further be understood that the machine learning module, in some examples, operates according to machine learning principles and/or techniques known in the art without departing from the systems and/or methods described herein.

In an example, the machine learning module of the classifier model trainer 228 makes use of training data pairs when applying machine learning techniques and/or algorithms. Millions of training data pairs (or more) may be stored in the call audio data store 214 and/or another machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

The synthetic conversation module 230 includes hardware, firmware, and/or software configured to interact with an incoming call on the call interface 204 by generating a synthetic voice to respond to and make requests of the calling party of the incoming call. In some examples, the synthetic conversation module 230 is configured to inform the calling party that a call screening service is currently in use and/or request information from the calling party, such as an identifier of the calling party and/or a purpose of the call. Further, the synthetic conversation module 230 is configured to work in conjunction with other components of the call screening engine 212 to perform an unsubscribe operations when the incoming call audio pattern 210 indicates that the unsubscribe operation includes a user saying a word or phrase (e.g., the incoming call includes instructions to say the word "unsubscribe" to unsubscribe from the call list). The synthetic conversation module 230 is configured to mimic or simulate human speech and/or other audio input, such as audio tones simulating a user pressing keys on a phone, on the incoming call via the call interface 204. For instance, when the call audio pattern 210 indicates that the unsubscribe operation is to press the "5" key on the phone and the call screening engine 212 has instructions from the user to unsubscribe, the engine 212 causes the synthetic conversation module 230 to simulate the "5" key being pressed via the call interface 204.

In addition to the automated call audio pattern set 216, which has been described above with respect to the automated call audio pattern set 116 of FIG. 1, the call audio data store 214 further includes a known caller data set 232 and a high-risk merchant data set 234. These additional lists may be used by the call screening engine 212 and, more specifically, the classifier model trainer 228 when training the call classifier model 226. In some examples, the known caller data set 232 includes a list of caller identification information that is further associated with context data that is of use to the call screening engine 212. For instance, the known caller data set 232 includes a list of phone numbers of callers that are known to be callers that users have unsubscribed from in the past or callers that have otherwise been flagged as making automated calls that are unwanted by users generally. It should be understood that the known caller data set 232 includes information about callers or call sources that has been gathered based on calls received by the user of the computing device upon which the call screening engine 212 is being used and/or based on calls received by a plurality of users that may or may not be using similar call screening engines or other applications. Additionally, when a user chooses to unsubscribe to an incoming call, the information associated with that incoming call may be recorded in the known caller data set 232 as a call from which the user previously attempted to unsubscribe. This information may then be used later by the call screening engine 212 when determining what action to take in response to receiving another call from the caller (e.g., the call screening engine 212 may determine to automatically attempt to unsubscribe again without prompting the user, to flag calls from the calling party to be blocked in the future, and/or to simply end the call).

Further, in some examples, the known caller data set 232 is used to track call sources that call a user again, despite the user unsubscribing from an associated call list. Such repeat call sources are recorded in an unsubscribed call source data set of the known caller data set 232 that is specifically associated with the user that unsubscribed from the call sources. The call screening engine is configured to identify calls that are received from repeat call sources that are in the unsubscribed call source data set and take additional action, such as storing the audio data of the call from the repeat call sources and making the audio data available for users in the event the users take some form of legal action against the repeat call source.

The high-risk merchant data set 234 includes information about merchants that are known to exhibit fraudulent or otherwise bad behavior in interactions with customers. The data of the high-risk merchant data set 234 includes identification information of the listed merchants and further context information (e.g., types of behavior to watch out for). Such information may further influence decisions made by the call screening engine 212, including causing the call screening engine 212 to more likely determine that a call from a call source associated with a high-risk merchant in the high-risk merchant data set 234 should be ignored, blocked, or otherwise treated as a potentially fraudulent call. Further, data of the high-risk merchant data set 234 may be included in a prompt to a user, enabling the user to make an informed decision based on the additional context provided by the high-risk merchant data.

It should further be understood that the identification information of entities on the known caller data set 232 and/or the high-risk merchant data set 234 may include call source profiles that are associated with a plurality of phone numbers and/or other identification information. For instance, call source profile for a company that has made automated calls to many different users may include a range of different phone number and also variants of other identification information, such as variations of the name of the company, different names or phrases that are present in automated call scripts the company uses, or the like. Further, when an incoming call is determined to substantially match the identification information an entity on the lists 232 and/or 234, the call screening engine 212 may be configured to update the call source profile with identification information from that matching incoming call.

Figure 3:
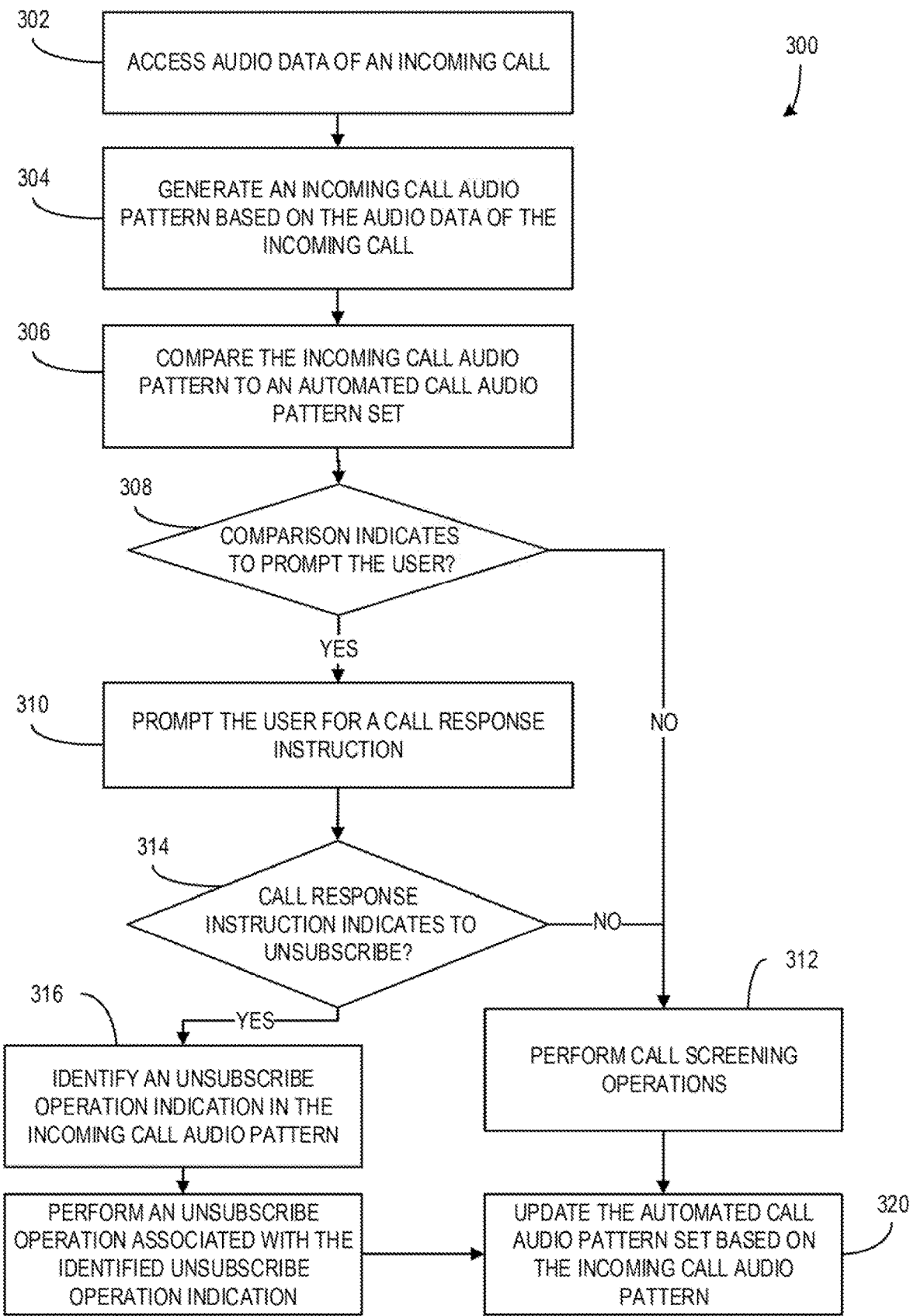
FIG. 3 is a flow chart illustrating a method of automatically unsubscribing from automated calls based on automated call audio patterns according to an embodiment.

FIG. 3 is a flow chart illustrating a method 300 of automatically unsubscribing from automated calls (e.g., incoming call 101) based on automated call audio patterns (e.g., automated call audio pattern set 116) according to an embodiment. In some examples, the method 300 is executed or otherwise performed on a computing device such as computing device 102 in FIG. 1 and/or components thereof, such as the call screening engines 112 and 212 of FIGS. 1 and 2, respectively.

At 302, the audio data of an incoming call is accessed. In an example, the audio data of the incoming call is accessed via a call interface of the associated computing device as described herein. It should be understood that the audio data is accessed in real-time, as the call is occurring. Further, in many cases, while the call has already been initiated at the beginning of method 300, the receiving user has not answered the call but, instead, initiated a call screening service as described herein. At 304, an incoming call audio pattern is generated based on the audio data of the incoming call. For instance, the generation of the incoming call audio pattern is performed by an audio pattern generator 108 and the process includes converting the audio data into text using speech-to-text techniques, voice recognition techniques, or the like.

At 306, the incoming call audio pattern is compared to an automated call audio pattern set. The comparison may include identifying matching keywords or phrases and/or matching metadata or context data associated with the audio patterns as described herein. In a further example, the comparison includes evaluating call pattern rules of an associated call classifier model that has been trained using the automated call audio pattern set as training data, as described herein. If, at 308, the comparison indicates that the user of the computing device should be prompted for instructions, the process proceeds to 312. Alternatively, if the comparison does not indicate that the user should be prompted, the process proceeds to 310. In some examples, the comparison indicates that the user should be prompted when the comparison indicates that the incoming call is likely to be an automated call that the user does not want to answer. As described above, the automated call audio pattern set includes audio patterns associated with many different automated calls and those patterns are associated with data indicating actions that were taken during the calls and/or user feedback based on the calls. If the comparison indicates that the current incoming call audio pattern is sufficiently similar to other automated calls that were unwanted by users, the comparison indicates that the user should be prompted for instructions with respect to the current incoming call. It should be understood that the sufficiency of the similarity between the current incoming call audio pattern and the automated call audio pattern set may be based on a number or value indicating identified similarities (e.g., a user prompt score 222) exceeding a defined threshold as described herein.

Additionally, if the comparison indicates to not prompt the user at 308, the process proceeds to performing call screening operations at 312. In some examples, if user prompting is not indicated, it is because either the comparison indicated that the incoming call is not an automated call (e.g., the call is from a real person and, thus, standard call screening operations should be performed). The call screening operations performed at 312 may include any call screening operations as would be understood by a person of ordinary skill in the art without departing from the description herein.

At 310, the user is prompted for a call response instruction. In some examples, the prompt interacts with the user of the computing device via a user interface 118 as described herein. The prompt includes information associated with the incoming call, such as identification of the calling party, a purpose of the call, transcribed text of the call so far, or the like. Additionally, or alternatively, the prompt may include audio data from the call by enabling the user to listen to at least a portion of the call prior to providing a response or instruction.

Figure 5:
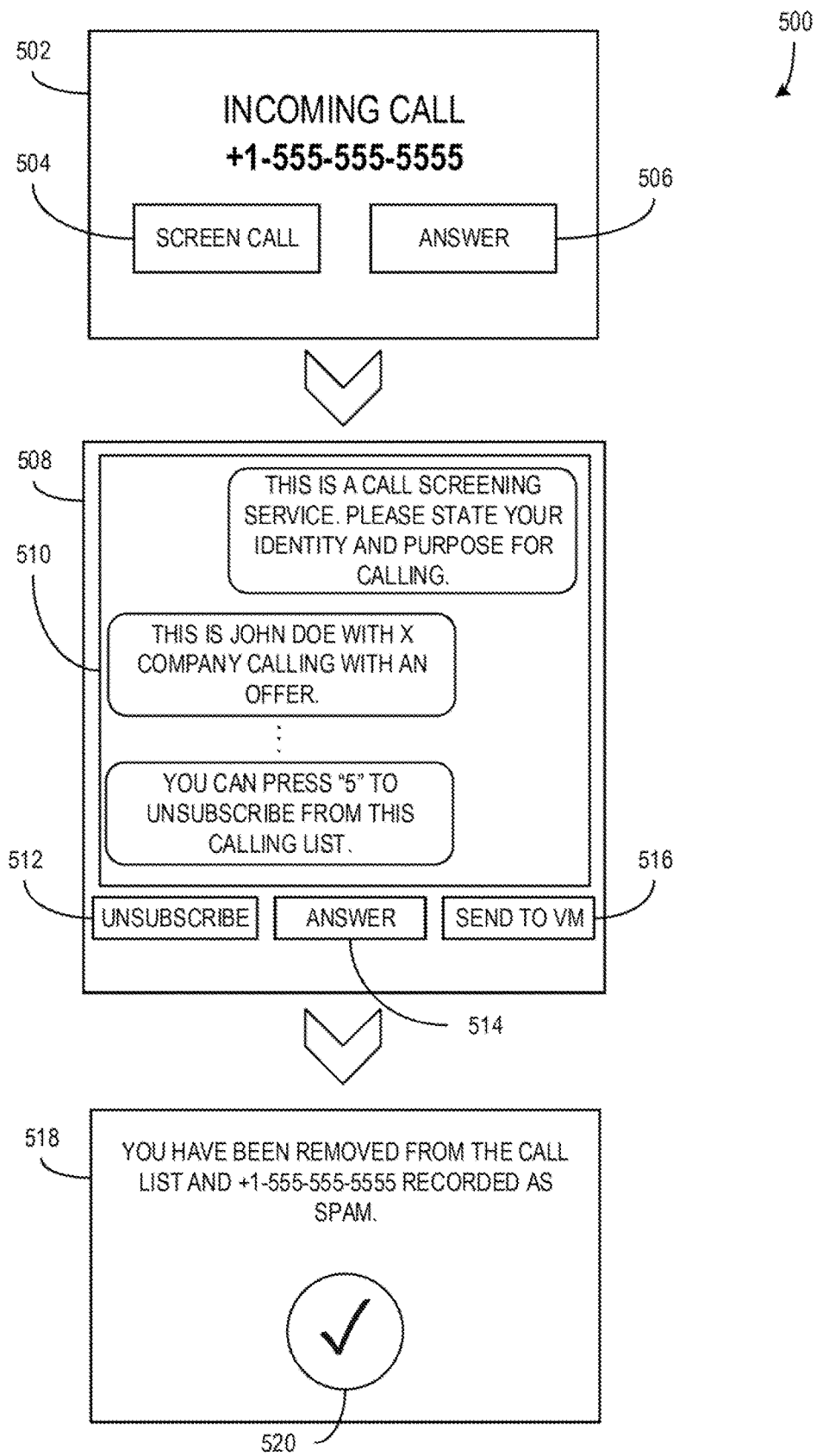
FIG. 5 is a illustration of a series of graphical user interfaces (GUIs) configured for prompting a user during a call screening process according to an embodiment.

Further, the prompt provides the user with a way to respond (e.g., displaying several buttons or other interface elements for use by the user, as shown in FIG. 5 below). Upon receiving a response from the user, at 314, if the call response instruction indicates to unsubscribe, the process proceeds to 316. Alternatively, if, at 314, the call response instruction does not indicate to unsubscribe, the process proceeds to 312 to perform call screening operations as described above. Further, the call response instruction may indicate to answer the call, hang up the call, send the call to voicemail, add the caller to a block list, or the like and such an instruction may be performed as requested by the user without departing from the description herein.

At 316, based on the instruction from the user to unsubscribe from the call, an unsubscribe operation indication is identified in the incoming call audio pattern. In some examples, identifying the unsubscribe operation indication includes identifying words, phrases, or other similar word patterns that are associated with unsubscribe operation indications in the incoming call audio pattern and thereby determining a portion of the incoming call audio pattern that is most likely to include the unsubscribe operation indication (e.g., identifying a phrase in the incoming call audio pattern that includes the word "unsubscribe" followed shortly by the phrase "press five" and determining that the unsubscribe operation indication is the "press five" portion of the audio pattern).

In further examples, identifying an unsubscribe operation indication in the call audio pattern may not be possible. In that case, the process may proceed with performance of call screening operations at 312 and/or the user may be informed via a user interface that an unsubscribe option for the incoming call was not identified. The user may be enabled to provide a new call response instruction, such as answering the call, hanging up the call, sending the call to voicemail, or the like.

At 318, an unsubscribe operation associated with the identified unsubscribe operation indication is performed. For instance, the unsubscribe operation may include the computing device and/or a component thereof (e.g., synthetic conversation module 230) simulating speaking a word or phrase and/or the pressing a button or key on the phone according to the unsubscribe operation indication identified at 316.

At 320, following the performance of the unsubscribe operation at 318 and/or the call screening operations performed at 312, the automated call audio pattern set is updated based on the incoming call audio pattern. In some examples, updating the automated call audio pattern set includes adding the incoming call audio pattern to the automated call audio pattern set and associating the added incoming call audio pattern with information indicating the action taken by the user and/or the computing device in response to the incoming call. Further, if the call was determined to not be an automated call, the incoming call audio pattern may be discarded rather than used to update the automated call audio pattern set. Alternatively, call audio patterns associated with calls that are determined to not be automated may be included in another call audio pattern set associated with the automated call audio pattern set and used during comparisons of future incoming calls in order to better identify calls that are not automated and handle them effectively.

Figure 4:
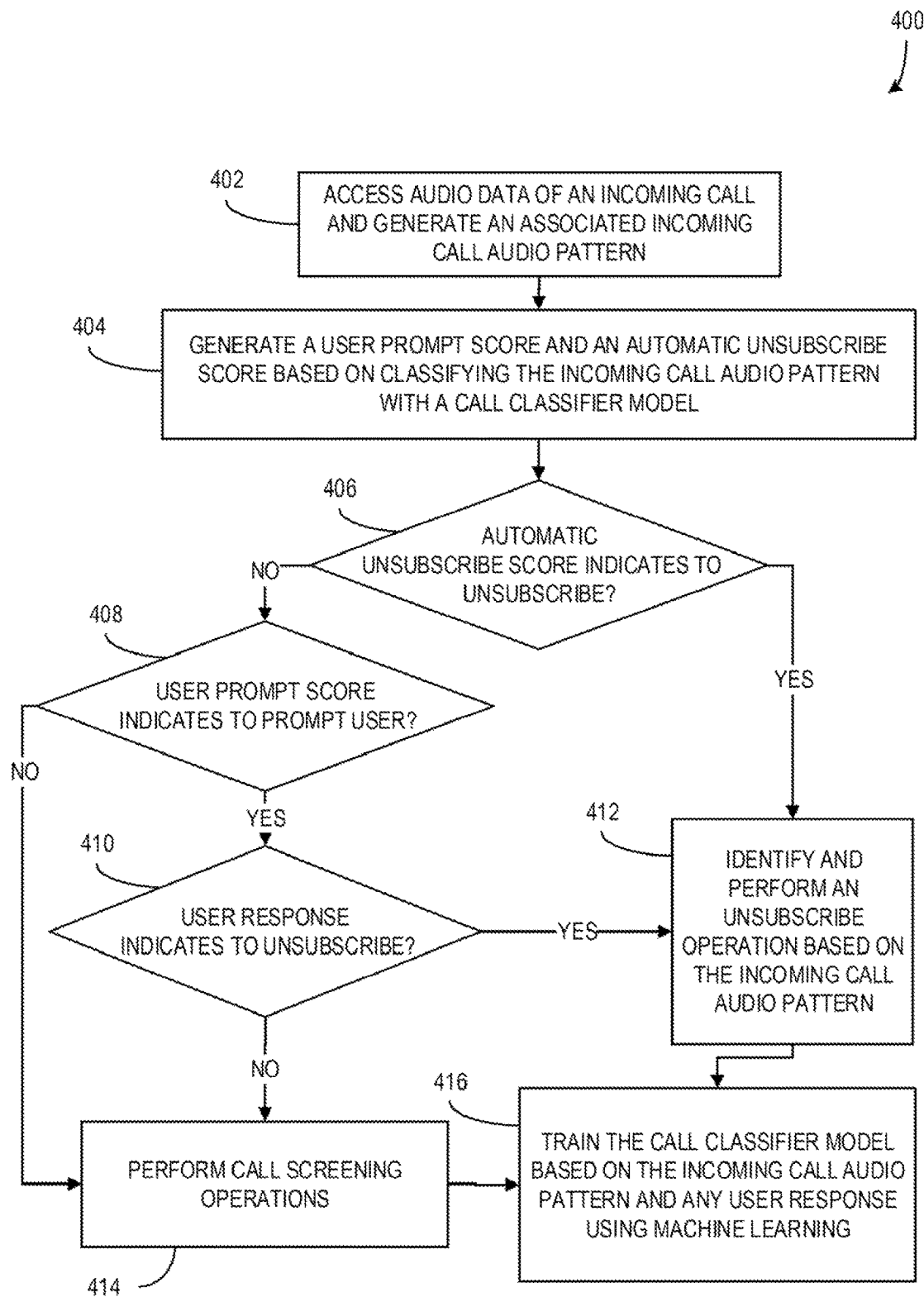
FIG. 4 is a flow chart illustrating a method of automatically unsubscribing from automated calls based on a trained call classifier model according to an embodiment.

FIG. 4 is a flow chart illustrating a method 400 of automatically unsubscribing from automated calls based on a trained call classifier model according to an embodiment. In some examples, the method 400 of FIG. 4 is implemented and/or executed on a system such as system 200 of FIG. 2 including system components such as the call screening engine 212. At 402, the audio data of an incoming call is accessed and an associated incoming call audio pattern is generated in a substantially similar manner as described above with respect to 302-304 of FIG. 3. At 404, a user prompt score and an automatic unsubscribe score are generated based on classifying the incoming call audio pattern with a call classifier model. In some examples, generating the user prompt score (e.g. user prompt score 222) and/or the automatic unsubscribe score (e.g., unsubscribe score 224) includes evaluating one or more call pattern rules of the call classifier model (e.g., call classifier model 226) based on the incoming call audio pattern and applying score increment values, score decrement values, or other score adjustment values associated with the call pattern rules to the scores. Upon evaluation of the call pattern rules of the call classifier model, the resulting automatic unsubscribe score and user prompt score are evaluated at 406 and 408, respectively, as described herein.

At 406, if the automatic unsubscribe score indicates to unsubscribe from the calling party and/or an associated call list of the incoming call, the process proceeds to 412. Alternatively, if the automatic unsubscribe score does not indicate to immediately unsubscribe from the incoming call, the process proceeds to 408. In some examples, the automatic unsubscribe score is evaluated at 406 by comparing it to a defined automatic unsubscribe threshold.

At 408, if the user prompt score indicates to prompt the user to provide instructions with respect to the incoming call, the process proceeds to 410. Alternatively, if the user prompt score does not indicate to prompt the user, the process proceeds to 414. As with the automatic unsubscribe score, in some examples, evaluation of the user prompt score includes comparing the user prompt score to a defined user prompt threshold.

It should be understood that the defined thresholds may be defined by developers, technicians, or other users of the described systems. Additionally, or alternatively, the thresholds used to evaluate the automatic unsubscribe score and/or user prompt score may be associated with the call classifier model and defined and/or adjusted dynamically during the training and/or use of the call classifier model as described herein (e.g., the automatic unsubscribe threshold and/or the user prompt threshold are dynamically defined during training of the call classifier model using machine learning techniques).

Further, while the evaluation of the automatic unsubscribe score as illustrated occurs before the evaluation of the user prompt score, it should be understood that, in alternative examples, the scores may be evaluated in the opposite order and/or according to another arrangement without departing from the description herein.

At 410, if the user response indicates to unsubscribe from the call, the process proceeds to 412. Alternatively, if the user response does not indicate to unsubscribe from the call or if a user response is otherwise not received, the process proceeds 414.

At 412, based on either the automatic unsubscribe score or the user response indicating to unsubscribe from the incoming call, an unsubscribe operation or operations are identified and performed based on the incoming audio call pattern. In some examples, the identification and performance of the unsubscribe operation may occur in a substantially similar manner to 316-318 of FIG. 3 as described above. For instance, a particular key press is identified in the incoming call audio pattern as the likely unsubscribe operation and that key press is simulated or otherwise performed in the incoming call.

Alternatively, at 414, call screening operations are performed in a substantially similar manner to the call screening operations described above at 312 of FIG. 3.

After either the performance of an unsubscribe operation at 412 or the performance of call screening operations at 414, the call classifier model is trained based on the incoming call audio pattern and any user response using machine learning at 416. In some examples, the training of the call classifier model is performed in a substantially similar manner as described above with respect to the classifier model trainer 228 of FIG. 2. For instance, when the user provides a response that indicates to unsubscribe from a recent call, the associated call pattern and the user's response is used to train the call classifier model such that, during future calls that have similar call patterns to the recent call, generated user prompt scores are more likely to indicate to prompt the user and/or generated automatic unsubscribe scores are more likely to indicate to automatically unsubscribe from the call.

Additional Example Scenarios

Aspects of the disclosure enable various additional scenarios, such as next described.

FIG. 5 is an illustration of a series of graphical user interfaces (GUIs) configured for prompting a user during a call screening process according to an embodiment. In an example associated with FIG. 5, a user has a mobile phone that includes a call screening engine configured as described herein. The user receives a call on the mobile phone, resulting in the touchscreen of the mobile phone displaying the GUI 502, including displaying an incoming call notification with the number of the incoming call, and buttons 504 and 506 that are configured to enable the user to screen the call or answer the call respectively.

The user selects to screen the call by activating the button 504, and the mobile phone answers the call in a call screening mode and begins to receive audio data from the calling party. An audio pattern generator installed on the mobile phone begins to generate a call audio pattern as the audio data is received, including generating text from the audio data using speech-to-text conversion. The generated call audio pattern is provided to the call screening engine and the call screening engine compares the call audio pattern to an automated call audio pattern set as described herein. The call screening engine determines that, in the initial portion of the call audio pattern, the calling party mentions the name of "X Company" and the word "offer", which is sufficiently close to other known automated call audio patterns in the pattern set to indicate that the user should be prompted to decide whether to unsubscribe or not.

Prompting the user includes causing the touchscreen of the mobile phone to display the GUI 508, including a current call transcript portion 510 and buttons 512, 514, and 516 that enable the user to indicate to unsubscribe from the call, answer the call, or send the call to voicemail respectively. As shown, the computing device engaged in a synthetic conversation with the calling party by first notifying the party that the call is being received by the call screening service.

Based on being prompted, the user activates button 512, instructing the mobile phone and the associated call screening engine to attempt to unsubscribe from the call list associated with the call. The transcript 510 has revealed to the user that the unsubscribe operation for the call is pressing "5", so the user is confident that the unsubscribe instruction to the call screening engine should be successful. The call screening engine receives the instruction to unsubscribe and performs an analysis of the text of the call audio pattern to identify that pressing "5" is the unsubscribe operation. The call screen engine proceeds to generate an audio tone o the call that corresponds to pressing the "5" on a keypad, indicating to the calling party that the user has requested to unsubscribe from the call list.

After the unsubscribe operation is performed, the call screening engine ends the call and records the number associated with the call, as well as metadata associated with the identity of the calling party (e.g., metadata associated with "X Company") as spam in a known caller data set. The GUI 518 is displayed on the touchscreen of the mobile phone to notify the user that the unsubscribe operation has been performed. The user is provided with a button 520 enabling the user to confirm that the notification has been received. The user activates the button 520 and the mobile phone returns to an operating state from prior to receiving the phone call.

Exemplary Operating Environment

Figure 6:
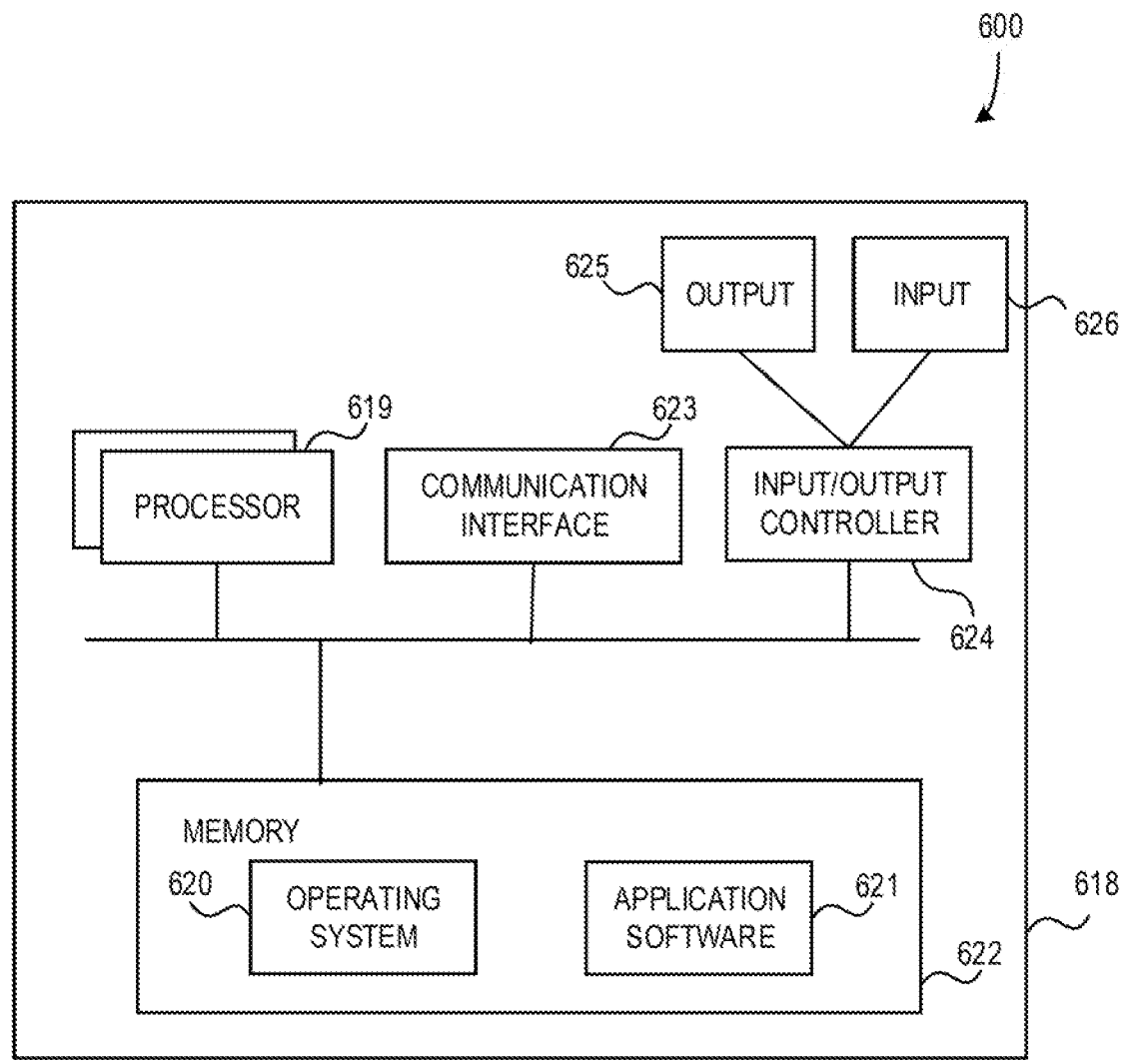
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, automatically unsubscribing from automated calls based on call audio patterns as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor of a computing device of a user; and at least one memory comprising computer program code, the at least one memory and the computer program code configured to, with the at least one processor, cause the at least one processor to: access, by a call screening engine on the computing device, audio data of an incoming call; generate, by the call screening engine, an incoming call audio pattern based on the audio data of the incoming call; compare, by the call screening engine, the incoming call audio pattern to an automated call audio pattern set, the automated call audio pattern set including at least one of audio patterns associated with calls identified as automated calls or audio patterns associated with calls from which users have previously unsubscribed; based on comparing the incoming call audio pattern to the automated call audio pattern set, prompt, by the call screening engine, the user for a call response instruction; and based on the call response instruction from the user: identify, by the call screening engine, an unsubscribe operation indication in the incoming call audio pattern; perform, by the call screening engine, an unsubscribe operation associated with the identified unsubscribe operation indication; and update, by the call screening engine, the automated call audio pattern set based on the incoming call audio pattern.

A computerized method for automatically unsubscribing from automated calls based on automated call audio patterns comprises: accessing, by a call screening engine on a computing device of a user, audio data of an incoming call; generating, by the call screening engine, an incoming call audio pattern based on the audio data of the incoming call; comparing, by the call screening engine, the incoming call audio pattern to an automated call audio pattern set, the automated call audio pattern set including at least one of audio patterns associated with calls identified as automated calls or audio patterns associated with calls from which users have previously unsubscribed; based on comparing the incoming call audio pattern to the automated call audio pattern set, prompting, by the call screening engine, the user for a call response instruction; and based on the call response instruction from the user: identifying, by the call screening engine, an unsubscribe operation indication in the incoming call audio pattern; performing, by the call screening engine, an unsubscribe operation associated with the identified unsubscribe operation indication; and updating, by the call screening engine, the automated call audio pattern set based on the incoming call audio pattern.

One or more non-transitory computer readable storage media having computer-executable instructions for automatically unsubscribing from automated calls based on automated call audio patterns that, upon execution by a processor, cause the processor to at least: access, by a call screening engine, audio data of an incoming call; generate, by the call screening engine, an incoming call audio pattern based on the audio data of the incoming call; compare, by the call screening engine, the incoming call audio pattern to an automated call audio pattern set, the automated call audio pattern set including at least one of audio patterns associated with calls identified as automated calls or audio patterns associated with calls from which users have previously unsubscribed; based on comparing the incoming call audio pattern to the automated call audio pattern set, prompt, by the call screening engine, the user for a call response instruction; and based on the call response instruction from the user: identify, by the call screening engine, an unsubscribe operation indication in the incoming call audio pattern; perform, by the call screening engine, an unsubscribe operation associated with the identified unsubscribe operation indication; and update, by the call screening engine, the automated call audio pattern set based on the incoming call audio pattern.

Alternatively, or in addition to the other examples described herein, examples include any combination of the following:

wherein comparing the incoming call audio pattern to the automated call audio pattern set includes generating a user prompt score associated with the incoming call audio pattern based on similarities between pattern portions of the incoming call audio pattern and pattern portions of the automated call audio pattern set; and wherein prompting the user for the call response instruction is further based on the generated user prompt score exceeding a user prompt threshold.

wherein comparing the incoming call audio pattern to the automated call audio pattern set includes generating an automatic unsubscribe score associated with the incoming call audio pattern based on similarities between pattern portions of the incoming call audio pattern and pattern portions of the automated call audio pattern set; and wherein the at least one memory and the computer program code are configured to, with the at least one processor, further cause the at least one processor to: based on the automatic unsubscribe score exceeding an automatic unsubscribe threshold, identify, by the call screening engine, the unsubscribe operation indication in the incoming call audio pattern and perform, by the call screening engine, the unsubscribe operation associated with the identified unsubscribe operation indication without prompting the user.

wherein generating the incoming call audio pattern includes determining a call source of the incoming call audio pattern; and wherein updating the automated call audio pattern set based on the incoming call audio pattern includes recording the determined call source in an unsubscribed call source data set.

wherein comparing the incoming call audio pattern to an automated call audio pattern set further includes comparing the determined call source to call sources in a high-risk merchant data set; wherein prompting the user for the call response instruction is further based on the determined call source matching at least one call source in the high-risk merchant data set; and wherein prompting the user includes providing an indication to the user that the determined call source is associated with a high-risk merchant of the high-risk merchant data set associated with the matched at least one call source.

further comprising: based on the determined call source of the incoming call audio pattern matching a recorded call source in the unsubscribed call source data set, storing the accessed audio data of the incoming call in a repeat call data store, whereby the stored audio data is made available to the user for use in taking action against the call source.

wherein prompting the user for the call response instruction includes enabling the user to listen to at least a portion of the incoming call.

wherein comparing the incoming call audio pattern to the automated call audio pattern set further includes classifying the incoming call audio pattern based on a call classifier model associated with the automated call audio pattern set; wherein prompting the user for a call response instruction is further based on a classification result of classifying the incoming call audio pattern; and wherein updating the automated call audio pattern set further includes training the call classifier model based on the updated automated call audio pattern set.

further comprising: based on comparing the incoming call audio pattern to the automated call audio pattern set, request, by the call screening engine, from a calling party of the incoming call, at least one of a calling party identifier or a call purpose; and based on receiving at least one of the calling party identifier or the call purpose, provide, by the call screening engine, the received at least one of the calling party identifier or the call purpose to the user when prompting the user for a call response instruction.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for accessing audio data of an incoming call; exemplary means for generating an incoming call audio pattern based on the audio data of the incoming call; exemplary means for comparing the incoming call audio pattern to an automated call audio pattern set, the automated call audio pattern set including at least one of audio patterns associated with calls identified as automated calls or audio patterns associated with calls from which users have previously unsubscribed; based on comparing the incoming call audio pattern to the automated call audio pattern set, exemplary means for prompting the user for a call response instruction; based on the call response instruction from the user, exemplary means for identifying an unsubscribe operation indication in the incoming call audio pattern; exemplary means for performing an unsubscribe operation associated with the identified unsubscribe operation indication; and exemplary means for updating the automated call audio pattern set based on the incoming call audio pattern.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for automatically unsubscribing from automated calls based on automated call audio patterns, the system comprising:

at least one processor of a computing device of a user; and at least one memory comprising computer program code, the at least one memory and the computer program code configured to, with the at least one processor, cause the at least one processor to:

access, by a call screening engine on the computing device, audio data of an incoming call;

generate, by the call screening engine, an incoming call audio pattern based on the audio data of the incoming call;

compare, by the call screening engine, the incoming call audio pattern to an automated call audio pattern set, the automated call audio pattern set including at least one of audio patterns associated with calls identified as automated calls or audio patterns associated with calls from which users have previously unsubscribed;

based on comparing the incoming call audio pattern to the automated call audio pattern set, prompt, by the call screening engine, the user for a call response instruction; and based on the call response instruction from the user:
identify, by the call screening engine, an unsubscribe operation indication in the incoming call audio pattern;
perform, by the call screening engine, an unsubscribe operation associated with the identified unsubscribe operation indication; and
update, by the call screening engine, the automated call audio pattern set based on the incoming call audio pattern.

2. The system of claim 1, wherein comparing the incoming call audio pattern to the automated call audio pattern set includes generating a user prompt score associated with the incoming call audio pattern based on similarities between pattern portions of the incoming call audio pattern and pattern portions of the automated call audio pattern set; and
wherein prompting the user for the call response instruction is further based on the generated user prompt score exceeding a user prompt threshold.

3. The system of claim 2, wherein comparing the incoming call audio pattern to the automated call audio pattern set includes generating an automatic unsubscribe score associated with the incoming call audio pattern based on similarities between pattern portions of the incoming call audio pattern and pattern portions of the automated call audio pattern set; and
wherein the at least one memory and the computer program code are configured to, with the at least one processor, further cause the at least one processor to:
based on the automatic unsubscribe score exceeding an automatic unsubscribe threshold, identify, by the call screening engine, the unsubscribe operation indication in the incoming call audio pattern and perform, by the call screening engine, the unsubscribe operation associated with the identified unsubscribe operation indication without prompting the user.

4. The system of claim 1, wherein generating the incoming call audio pattern includes determining a call source of the incoming call audio pattern; and
wherein updating the automated call audio pattern set based on the incoming call audio pattern includes recording the determined call source in an unsubscribed call source data set.

5. The system of claim 4, wherein comparing the incoming call audio pattern to an automated call audio pattern set further includes comparing the determined call source to call sources in a high-risk merchant data set;
wherein prompting the user for the call response instruction is further based on the determined call source matching at least one call source in the high-risk merchant data set; and
wherein prompting the user includes providing an indication to the user that the determined call source is associated with a high-risk merchant of the high-risk merchant data set associated with the matched at least one call source.

6. The system of claim 4, wherein the at least one memory and the computer program code are configured to, with the at least one processor, further cause the at least one processor to:
based on the determined call source of the incoming call audio pattern matching a recorded call source in the unsubscribed call source data set, storing the accessed audio data of the incoming call in a repeat call data store, whereby the stored audio data is made available to the user for use in taking action against the call source.

7. The system of claim 1, wherein prompting the user for the call response instruction includes enabling the user to listen to at least a portion of the incoming call.

8. The system of claim 1, wherein comparing the incoming call audio pattern to the automated call audio pattern set further includes classifying the incoming call audio pattern based on a call classifier model associated with the automated call audio pattern set;
wherein prompting the user for a call response instruction is further based on a classification result of classifying the incoming call audio pattern; and
wherein updating the automated call audio pattern set further includes training the call classifier model based on the updated automated call audio pattern set.

9. The system of claim 1, wherein the at least one memory and the computer program code are configured to, with the at least one processor, further cause the at least one processor to:
based on comparing the incoming call audio pattern to the automated call audio pattern set, request, by the call screening engine, from a calling party of the incoming call, at least one of a calling party identifier or a call purpose; and
based on receiving at least one of the calling party identifier or the call purpose, provide, by the call screening engine, the received at least one of the calling party identifier or the call purpose to the user when prompting the user for a call response instruction.

10. A computerized method for automatically unsubscribing from automated calls based on automated call audio patterns, the method comprising:
accessing, by a call screening engine on a computing device of a user, audio data of an incoming call;
generating, by the call screening engine, an incoming call audio pattern based on the audio data of the incoming call;
comparing, by the call screening engine, the incoming call audio pattern to an automated call audio pattern set, the automated call audio pattern set including at least one of audio patterns associated with calls identified as automated calls or audio patterns associated with calls from which users have previously unsubscribed;
based on comparing the incoming call audio pattern to the automated call audio pattern set, prompting, by the call screening engine, the user for a call response instruction; and
based on the call response instruction from the user:
identifying, by the call screening engine, an unsubscribe operation indication in the incoming call audio pattern;
performing, by the call screening engine, an unsubscribe operation associated with the identified unsubscribe operation indication; and
updating, by the call screening engine, the automated call audio pattern set based on the incoming call audio pattern.

11. The computerized method of claim 10, wherein comparing the incoming call audio pattern to the automated call audio pattern set includes generating a user prompt score associated with the incoming call audio pattern based on similarities between pattern portions of the incoming call audio pattern and pattern portions of the automated call audio pattern set; and wherein prompting the user for the call response instruction is further based on the generated user prompt score exceeding a user prompt threshold.

12. The computerized method of claim 11, wherein comparing the incoming call audio pattern to the automated call audio pattern set includes generating an automatic unsubscribe score associated with the incoming call audio pattern based on similarities between pattern portions of the incoming call audio pattern and pattern portions of the automated call audio pattern set; and Further comprising:
based on the automatic unsubscribe score exceeding an automatic unsubscribe threshold, identifying, by the call screening engine, the unsubscribe operation indication in the incoming call audio pattern and performing, by the call screening engine, the unsubscribe operation associated with the identified unsubscribe operation indication without prompting the user.

13. The computerized method of claim 10, wherein generating the incoming call audio pattern includes determining a call source of the incoming call audio pattern; and
wherein updating the automated call audio pattern set based on the incoming call audio pattern includes recording the determined call source in an unsubscribed call source data set.

14. The computerized method of claim 13, wherein comparing the incoming call audio pattern to an automated call audio pattern set further includes comparing the determined call source to call sources in a high-risk merchant data set;
wherein prompting the user for the call response instruction is further based on the determined call source matching at least one call source in the high-risk merchant data set; and
wherein prompting the user includes providing an indication to the user that the determined call source is associated with a high-risk merchant of the high-risk merchant data set associated with the matched at least one call source.

15. The computerized method of claim 13, further comprising, based on the determined call source of the incoming call audio pattern matching a recorded call source in the unsubscribed call source data set, storing the accessed audio data of the incoming call in a repeat call data store, whereby the stored audio data is made available to the user for use in taking action against the call source.

16. The computerized method of claim 10, wherein prompting the user for the call response instruction includes enabling the user to listen to at least a portion of the incoming call.

17. The computerized method of claim 10, wherein comparing the incoming call audio pattern to the automated call audio pattern set further includes classifying the incoming call audio pattern based on a call classifier model associated with the automated call audio pattern set;
wherein prompting the user for a call response instruction is further based on a classification result of classifying the incoming call audio pattern; and
wherein updating the automated call audio pattern set further includes training the call classifier model based on the updated automated call audio pattern set.

18. The computerized method of claim 10, further comprising:
based on comparing the incoming call audio pattern to the automated call audio pattern set, requesting, by the call screening engine, from a calling party of the incoming call, at least one of a calling party identifier or a call purpose; and
based on receiving the at least one of the calling party identifier or the call purpose, providing, by the call screening engine, the received at least one of the calling party identifier or the call purpose to the user when prompting the user for a call response instruction.

19. One or more non-transitory computer readable storage medium having computer-executable instructions for automatically unsubscribing from automated calls based on automated call audio patterns that, upon execution by a processor, cause the processor to at least:
access, by a call screening engine, audio data of an incoming call;
generate, by the call screening engine, an incoming call audio pattern based on the audio data of the incoming call;
compare, by the call screening engine, the incoming call audio pattern to an automated call audio pattern set, the automated call audio pattern set including at least one of audio patterns associated with calls identified as automated calls or audio patterns associated with calls from which users have previously unsubscribed;
based on comparing the incoming call audio pattern to the automated call audio pattern set, prompt, by the call screening engine, the user for a call response instruction; and
based on the call response instruction from the user:
identify, by the call screening engine, an unsubscribe operation indication in the incoming call audio pattern;
perform, by the call screening engine, an unsubscribe operation associated with the identified unsubscribe operation indication; and
update, by the call screening engine, the automated call audio pattern set based on the incoming call audio pattern.

20. The one or more non-transitory computer storage medium of claim 19, wherein comparing the incoming call audio pattern to the automated call audio pattern set includes generating a user prompt score and an automatic unsubscribe score associated with the incoming call audio pattern based on similarities between pattern portions of the incoming call audio pattern and pattern portions of the automated call audio pattern set;
wherein prompting the user for a call response instruction is further based on the generated user prompt score exceeding a user prompt threshold; and
wherein the computer-executable instructions, upon execution by a processor, further cause the processor to at least:
based on the automatic unsubscribe score exceeding an automatic unsubscribe threshold, identify, by the call screening engine, an unsubscribe operation indication in the incoming call audio pattern and perform, by the call screening engine, an unsubscribe operation associated with the identified unsubscribe operation indication without prompting the user.

* * * * *